United States Patent Office 3,099,602
Patented July 30, 1963

3,099,602
PROCESS OF PREPARING GUM ACACIA
PHARMACEUTICAL VEHICLE
Lawrence A. Anderson, Rochester, N.Y., assignor to Eastman Kodak Company, Rochester, N.Y., a corporation of New Jersey
No Drawing. Filed May 9, 1961, Ser. No. 108,711
15 Claims. (Cl. 167—81)

This invention relates to vitamins. More particularly, it relates to fat-soluble vitamin-active products characterized by being in a dry, free flowing, solid particle condition.

The so-called fat- or oil-soluble vitamins are naturally occurring substances having at least certain known biological activities or effects. As found in nature they are oleaginous compounds insoluble in water but soluble in oil and fat. Representative of the fat-soluble vitamins are those compounds commonly referred to as vitamins A, D, E and K. In the chemical investigation of these vitamins numerous other compounds have been derived and have been synthesized, which produce similar biological effects and, therefore, are said generally to have fat-soluble vitamin activity. Many of these synthetically produced compounds and derivatives are oleaginous substances insoluble in water but soluble in oil and fat. These fat-soluble vitamin-active compounds (which include the naturally occurring compounds, synthetically produced compounds and derivatives of the naturally occurring and synthetically produced compounds), being in an oily liquid state, are not satisfactory for many desired end uses because they are liquid. Hence, considerable effort has been devoted in the art to the problem of developing solid particle products containing these fat-soluble vitamin-active compounds.

Another aspect of the matter is that some of the fat-soluble vitamin-active compounds, particularly vitamin A and derivatives, in the presence of air readily and rapidly lose their biological activities. Hence, it is practically necessary to establish and maintain these compounds out of contact with air.

One approach to these problems has been what might be termed the solid carrier approach. In this approach the fat-soluble vitamin-active compound is dispersed within a solid matrix of a suitable carrier material. One such material is a naturally occurring gum commonly identified as gum acacia and also known as gum arabic. Gum acacia is a preferred carrier material because of its availability, cold water dispersibility and non-gellable properties.

In U.S. Patent No. 2,940,900 Benton et al. disclose a solid, vitamin E active product involving gum acacia as a carrier material and a process for preparing this product. This process involves a number of steps. The first step comprises forming a low consistency colloidal solution of gum acacia and water. The second step involves dispersing within the solution a vitamin E active compound or material such as α-tocopheryl acetate (an oil at room temperatures) whereby an emulsion is formed. It is required that the emulsion at this point have a low consistency. Hence, the water concentration is in a range from 35 to 60% by weight of the emulsion and selected to give an emulsion viscosity in a general range from 500 to as much as 20,000 centipoises, 500 to 2,000 centipoises being more commonly involved. The third step comprises spreading the emulsion into a thin layer on an evaporation surface (such as provided by a drum dryer) established and maintained at a sufficiently high temperature (240° F. to 350° F. being suggested) to rapidly evaporate sufficient water from the layer to form a substantially dry, porous frangible sheet. The final step involves comminuting the dry sheet into finely divided particles. The final step may also include leaching or washing of the particles with a suitable solvent to remove surface exposed vitamin E active compound.

While the product and process of Benton et al. are commercially acceptable, nevertheless, certain disadvantages do exist.

One disadvantage resides in the drying technique employed in the Benton et al. process, which is hereinafter referred to as the drum drying technique. The temperatures required by this technique are too high for many fat-soluble vitamin-active compounds. These compounds are heat sensitive or labile. Note, for instance, the crystalline complexes of certain phenolic materials and retinal (a generic term just recently adopted by the IUPAC for the vitamin A compound previously known as retinene or vitamin A aldehyde—see J. Am. Chem. Soc. 82, 5575–84 (1960)) and especially the crystalline complex of retinal and hydroquinone, referred to herein as retinal quinolate. These crystalline complexes of retinal and phenolic complexing agents and advantages of them are disclosed in U.S. Patents Nos. 2,683,746, 2,683,747, 2,765,343, 2,765,344 and 2,835,679. Under the conditions of the Benton et al. drum drying technique these complexes and particularly retinal quinolate tend to decompose or split.

Another disadvantage is that the products obtained by the Benton et al. process do not appear to provide the desired maximum oxidative protection under storage conditions to the oxidatively labile vitamin components.

Still another disadvantage is the difficulty in avoiding excess fine material or fines in the comminution of the dry sheets and thus the controlling of the particle size distribution of the products obtained thereby.

Yet another disadvantage is the fact that the products obtained thereby, being soft and porous, do not have bulk densities as high as desired.

Hence, there is a need for a new procedure for preparing solid products with a gum acacia carried. An object of this invention is to satisfy this need.

More particularly, an object of this invention is to provide a process for making solid products comprising a fat soluble vitamin-active component and gum acacia as a protective carrier therefor which avoids these disadvantages.

These objects can be achieved by preparing a dispersion of a fat-soluble vitamin-active component in an aqueous solution of gum acacia having a water concentration as low as possible so that the dispersion would be amenable to, and capable of, being handled in some practical way of low temperature drying. Drying of such a dispersion does not require the rapid removal of large quantities of water and, therefore, milder temperature conditions of drying can be employed, thereby avoiding or at least minimizing the aforementioned disadvantages. However, this raises two problems.

One problem stems from the fact that in forming the dispersion the aqueous solution of gum acacia and subsequently the mixture of fat-soluble vitamin-active component and solution must have a sufficiently low consistency or sufficiently high fluidity to achieve the proper degree of dispersion or emulsification of the vitamin component in the aqueous solution of gum acacia. If the proper degree of dispersion is not obtained, there will result a substantial loss of the fat-soluble vitamin active material during the conversion of the dispersion or emulsion into dry, solid particles. If the solution has too high a consistency at the time of dispersing the fat-soluble vitamin component, procurement of the desired degree and uniformity of dispersion under economical power input and equipment conditions is not practical. Consequently, a fairly high and, within limits, fairly critical water concentration is necessary to achieve the proper degree and uniformity of dispersion under practical conditions. Hence, there is a problem of preparing a dispersion having the fat-soluble vitamin-active component uniformly dispersed to the proper degree in the aqueous solution of gum acacia and at the same time having a water concentration at the low level desired.

The other problem is one of subdividing the low moisture content dispersion to a suitable extent for uniform and practical drying under the desired mild temperatures. This problem arises because at the low moisture contents involved the dispersion will have such a high consistency as to have low flowability.

Other objects of this invention are to provide a solution to these problems.

These and other objects which may appear as this specification proceeds are achieved by this invention.

In summary, this invention comprises a process for producing dry, free flowing, granular products based on gum acacia. This process involves a number of concepts. One concept involves forming a dispersion of a water-insoluble, water dispersible composition and an aqueous solution of gum acacia and water with the water concentration at a sufficiently high level to obtain the requisite degree of dispersion and then admixing with the dispersion enough gum acacia to reduce the water concentration to the lowest practical level. Another concept involves forming as by extrusion the resulting dough-like, highly consistent, plastic dispersion into a thin shape such as a filament, thin sheet and the like. Still another concept comprises drying the extruded plastic dispersion under mild and controlled low temperature drying conditions.

In somewhat greater detail the process of this invention involves these steps. The first step comprises preparing an aqueous dispersion consisting essentially of the water-insoluble, water dispersible composition, gum acacia and water with the water concentration being in a range from about 30% to about 60% by weight of the dispersion. The second step comprising reducing the water concentration of the dispersion primarily by admixing with said aqueous dispersion a quantity of gum acacia sufficient to cause the dispersion to become a plastic dough. The third step involves forming the plastic dough into a thin shape. The fourth step comprises drying at low temperatures the thin shaped dough whereby dry stock is formed. The fifth step comprises comminuting the dry stock to finely divided particles.

The first step of the process of this invention, the preparation of the dispersion, is preferably performed by first forming the aqueous solution of gum acacia and then dispersing in the aqueous solution the water-insoluble, dispersible composition. The aqueous solution is formed by admixing water and gum acacia preferably in finely divided form. In addition to water and gum acacia the aqueous solution can also comprise a plasticizer which, where the water-insoluble composition is a medicament or pharmaceutical for oral administration, as in the case of a fat-soluble vitamin composition, is an edible plasticizer such as, for example, sucrose, glucose, sorbitol, other carbohydrates and the like.

The water-insoluble, dispersible composition is usually, although not necessarily, a composition of matter which should be protected from the oxidative effects of air and/or which needs a carrier for dry, finely divided, solid particle uses.

In its more specific aspects this invention is directed to water-insoluble, water dispersible compositions which are pharmaceuticals or medicaments such as, for example, fat-soluble vitamin-active compositions. In even more specific aspects of this invention the water-insoluble, water dispersible composition comprises one or more fat-soluble vitamin-active compounds in liquid form, in finely divided solid form or in both forms. The fat-soluble vitamin-active composition can also comprise one or more antioxidants, such as, for example, butylated hydroxyanisole (BHA), butylated hydroxytoluene (BHT), propyl gallate and the like.

Dispersing of the water-insoluble, water dispersible composition in the aqueous solution is accomplished by vigorously stirring together the composition and the aqueous solution until a uniform dispersion is obtained and, in the case where a fat-soluble vitamin-active composition is involved which comprises a vitamin oil, until the oil droplet size is at least about 15 microns or less. When a fat-soluble vitamin-active composition is being dispersed, the ultimate maximum particle size of the dispersed composition regardless of whether it be solid, liquid or both solid and liquid should be 15 microns or less and preferably 8 microns or less in order to minimize the amount of leachable vitamin composition in the final product and to minimize separation of any vitamin composition upon mixing in the additional gum acacia.

Water concentration of the dispersion and thus of the aqueous solution prior to mixing in the water-insoluble, dispersible composition is important for a number of reasons.

In the first place water concentration has a direct relationship to consistency of the dispersion. It is necessary that the dispersion formed in this first step have a consistency such that the dispersion is stable at least to the point where substantial agglomeration and coalescence of the dispersed composition do not occur from the time the dispersion is formed until the second step of the process. At the same time the consistency should not be so great as to require impractical time and equipment conditions to achieve the proper degree and uniformity of dispersion. The consistency of the dispersion in general should be such that the Brookfield viscometer viscosity of the dispersion at 20° C. is in a range from about 500 to about 20,000 centipoises and usually from about 500 to about 2,000 centipoises.

In the second place, in the case of vitamin-active compositions, water concentration of the dispersion has a direct relationship to the quantity of additional gum acacia to be admixed in the second step with the dispersion and thus to the vitamin potency of the final dry product.

Water concentration of the dispersion and thus of the aqueous solution is selected, therefore, with these factors in mind. In general the water concentration is selected so that upon formation of the dispersion the water concentration lies in a range from about 30% to about 60% by weight of the dispersion with the preferred range being from about 32.5% to about 48% by weight of the dispersion. Once the dispersion has been formed, however, and particularly in order to obtain a final product of extremely high fat-soluble vitamin potency in the case of fat-soluble vitamin-active products, the water content of the dispersion can be reduced below about 30 percent by weight of evaporating the dispersion in a thin film, rapid type concentrator or evaporator, such as the Turba-Film or Roto-Vak evaporators, as a preliminary part of the second step of the process of this invention.

Concentration of the water-insoluble, dispersible composition varies according to what is desired in the end proudct. In the case of fat-soluble vitamin-active products concentration of the fat-soluble vitamin-active composition in the dispersion is governed for the most part by the vitamin potency or potencies desired in the end product. In general the concentration of the fat-soluble vitmin-active composition in the dispersion upon formation (before reduction of water concentration by evaporation, if performed) lies in a range from about 5% to about 60% by weight of the dispersion.

Concentration of the gum acacia in the dispersion is dependent on the vitamin potency or potencies desired in the end product in the case of fat-soluble vitamin-active products and on the consistency necessary to establish and maintain the water-insoluble, dispersible compositions in a substantially stable, dispersed condition from the time of formation of the dispersion to the mixing in of the additional gum acacia. In general and particularly in the case of fat-soluble vitamin-active products concentration of the gum acacia in the dispersion when it is formed lies in a range from about 10% to about 60% by weight of the dispersion upon formation.

Concentration of the plasticizer component can vary. However, about 25% by weight of the dispersion upon formation seems to be a top limit when a sugar is employed. In excess of this concentration the end product tends to be hygroscopic and to become sticky or gummy, thereby adversely affecting the free flowing property of the final product. Moreover, when this concentration is exceeded the drying step becomes difficult to perform.

The second step of the process of this invention, reducing the water concentration of the dispersion, which may include evaporation of the dispersion as a preliminary part of the step, preferably comprises adding to the dispersion in a mixer the additional gum acacia in a dry, finely divided form. Gum acacia having a maximum particle size of 80 mesh U.S. screen size has been found to be satisfactory for obtaining rapid and complete mixing and for efficient water pickup. Dry gum acacia having particle sizes greater than 80 mesh U.S. screen size can be used but in such case it is preferred to employ a heavy duty mixer, such as the Sigma mixer, which can grind the gum acacia simultaneously while admixing it into the dispersion.

The quantity of gum acacia added to the dispersion in the second step is also quite important. An insufficient quantity results in too great a fluidity of the plastic semi-solid and considerable stickiness, which are to be avoided in performing the third step of the process of this invention. An excessive quantity of gum acacia imparts an appreciable degree of non-homogeneity, porosity, and structural weakness to the end product. In general the quantity of additional, dry, finely divided gum acacia added is in a range from about 0.7 to about 1.4 times the weight of the non-aqueous constituents of the dispersion (about 1 to about 1.3 times the water content of the dispersion). In this range there results a tough, rubbery, extrudable, homogeneous, plastic dough.

The third step of this process comprises forming the plastic dough into a thin shape. This is accomplished by extruding the dough into such shapes as filaments, sheets and the like. Conventional extrusion equipment can be employed for this purpose. In the case of filament shapes such equipment may also include means for slicing the filaments into pellets and the like.

The next step of the process, drying the thin shaped dough under gentle and controlled low temperature drying conditions, whereby dry stock is formed, is performed by conventional ways and means. Air drying is a convenient way of carrying out this step. It may be accomplished in a conveyor-tunnel type dryer, a chain belt dryer and, if the dry stock is in the form of pellets and the like, a rotary dryer, double cone dryer, turbo-dryer and the like. Typical low temperatures are 100° F. up to about 212° F.

The last step of this process, comminuting the dry stock into finely divided particles, is performed in suitable grinding equipment. Preferably a particle size distribution in the range from 30 mesh to 100 mesh U.S. screen size is obtained.

An optional but nevertheless desirable step which can be employed, particularly in the case of fat-soluble vitamin-active products, is to leach the finely divided, dry, solid, fat-soluble, vitamin-active product with a suitable solvent for the fat-soluble vitamin component (but one in which all other components of the product are insoluble) in order to remove surface exposed vitamin component. This step involves washing the product with the solvent and then removing the solvent from the product as by filtration followed by gentle heat evaporation.

This invention is further illustrated by the following examples of certain specific embodiments thereof. This invention is not limited to these embodiments unless otherwise indicated. In the examples all percentages given are on a weight basis.

EXAMPLE 1

This example illustrates the preparation, a utility and some advantages of a vitamin A active product according to this invention.

A mixture of 120 grams of distilled, mixed isomer, retinal, 12.5 grams of butylated hydroxy anisole and 12.5 grams of butylated hydroxy toluene was dispersed under vigorous agitation in an aqueous solution containing 400 grams of gum acacia, 100 grams of sucrose, and 600 grams of water. An emulsion resulted in which droplet size of the dispersed phase was less than 8 microns. Approximately 850 grams of granular gum acacia essentially finer than 80 mesh U.S. screen size was mixed into the emulsion. A tough, rubbery, homogeneous, plastic dough was obtained. The dough was then extruded into a thin sheet, dried in ambient air, ground in a Wiley Mill rotary cutter, leached with hexane and redried. A dry, finely divided, vitamin A active, solid product was thus obtained. Bulk density of this product was 43.0 pounds per cubic foot. Particle size distribution according to screen fractions based on U.S. screen size was:

| | Percent |
|---|---|
| 30 to 40 mesh | 15.2 |
| 40 to 50 mesh | 33.5 |
| 50 to 60 mesh | 19.8 |
| 60 to 80 mesh | 17.9 |
| 80 to 100 mesh | 13.5 |
| Less than 100 mesh | 0.5 |

A portion of this product was incorporated into a standard tablet formulation and tableted in a Stokes Tablet Press. The tablets were subsequently leached with hexane by washing the tablets in the solvent, filtering and then air evaporating. It was found that about 2% by weight of the retinal was leached from the tablets. Under similar conditions whereby tablets were formed from spray dried vitamin A active powder, 23% by weight of the retinal was leached from the tablets.

EXAMPLE 2

This example illustrates another preparation of a vitamin A active product in accordance with this invention.

A mixture of 240 grams of distilled, mixed isomer retinal, 12.5 grams of butylated hydroxyanisole and 12.5 grams of butylated hydroxytoluene were emulsified in an aqueous solution containing 400 grams of gum acacia, 100 grams of sucrose, 48 milliliters of a 1/20 solution of concentrated NH$_4$OH in water, and 525 milliliters of water. To this emulsion were added 795 grams of granular acacia essentially finer than 80 mesh U.S. screen size. After intimate mixing, there resulted a plastic dough. The dough was extruded into filaments, dried in ambient air, ground in a Wiley rotary cutter, leached with hexane by washing and filtering, and air dried. Particle size distribution, according to screen fractions based on U.S. screen size, of the ground product, a powder, was:

| | Percent |
|---|---|
| 30 to 40 mesh | 27.2 |
| 40 to 50 mesh | 28.0 |
| 50 to 60 mesh | 15.4 |
| 60 to 70 mesh | 10.1 |
| 70 to 80 mesh | 9.4 |
| 80 to 100 mesh | 9.8 |

Bulk density of the product was 42.3 pounds per cubic foot.

Stability tests were conducted on this product and similarly formulated products prepared by the drum drying procedure of Benton et al. and prepared by a spray drying procedure which involves spraying the dispersion into heated air. These tests involved storing the products for selected periods of time at 37° C. and 58% relative humidity and then determining the percentage of original vitamin potency remaining. The results are tabulated as follows:

Table I

|  | 21 days | 35 days | 63 days | 91 days |
|---|---|---|---|---|
| 1. Example 2 Product | | 96 | 102 | 87 | 78 |
| 2. Spray Dried Product | | 93 | 86 | 75 | |
| 3. Drum Dried Product | | 92 | 87 | | |

The data demonstrate the greater oxidative stability of the product of this invention. The 35 days' value for the Example 2 product is greater than might be expected. However, the difference looks like a normal assay and sample variation.

EXAMPLE 3

This example illustrates the preparation according to the process of this invention, of a vitamin A active product comprising retinal quinolate.

A 112 gram sample of finely divided, recrystallized retinal quinolate (less than 15 microns in particle size) was dispersed in an aqueous solution consisting of 300 grams gum acacia, 100 grams sucrose and 450 grams water. To this dispersion were added with intimate mixing 606 grams of dry, finely divided acacia. There was obtained a gum-like dough. This dough was then extruded into cylindrical filaments which were dried in ambient air and comminuted. A portion of the comminuted particles were leached with hexane and redried. The superiority of the dry acacia preparation made in this manner as compared with a similar product which had been atmospherically drum dried as by the procedure of Benton et al. is shown by the following table.

Table II

|  | Product of Invention | Drum Dried Product |
|---|---|---|
| Loss of potency during processing and drying | 0.0 | 15.2 |
| Percent of vitamin removed by leaching operation | 9.84 | 15.6 |
| Loss of vitamin potency from unleached samples during 35 day storage at 375° C. and 57% R.H. | 0.0 | 18.0 |
| Loss of vitamin potency from leached samples during 35 day storage at 37° C. and 58% R.H. | 0.0-1.0 | |
| Total vitamin loss form unleached samples as a result of processing and 35 day storage | 0.0 | 30.5 |

Thus, the product of the process of this invention provides greater stability to its retinal quinolate content than the drum dried product prepared according to the technique of Benton et al.

EXAMPLE 4

This example illustrates the high degree of protection which a product prepared according to the process of this invention has for its retinal quinolate content when the product is incorporated into mineral containing animal feeds.

A 240 gram sample of finely divided crystals of retinal quinolate (15 microns in size) was dispersed in an aqueous solution containing 400 grams gum acacia, 100 grams sucrose and 600 grams water. To this dispersion were added 800 grams of granular acacia essentially finer than 80 mesh U.S. screen size. After intimate mixing a plastic dough was obtained. This dough was extruded into filaments, and cut up into pellets which were dried in ambient air, ground, leached with hexane, and redried. The product as well as a similar product obtained by way of a ground gelatin sheet were subjected to stability tests in a mineral containing animal feed. The superior stability of this dry product is shown in the following table:

|  | Percent Vitamin A Potency in Feed at 37° C. and 58% R.H. | |
|---|---|---|
|  | 2 months | 4 months |
| 1. Gum Acacia Product | 97 | 94 |
| 2. Gelatin Product | 48 | 31 |

EXAMPLE 5

This example illustrates the preparation according to the process of this invention of a dry, finely divided, vitamin E active, solid product.

A 521 gram sample of α-tocopheryl acetate was dispersed in an aqueous solution containing 458 grams of gum acacia, 73 grams sucrose, 3.0 grams methylparahydroxybenzoate and 684 grams water. Approximately 740 grams of granular acacia essentially finer than 80 mesh U.S. screen size were then mixed into this dispersion. A plastic dough resulted. This plastic dough was then extruded into filaments which were ground, sieved, leached with hexane, and redried. The bulk density of a minus 20 plus 30 mesh U.S. screen size fraction of this powder was 35 pounds per cubic foot as compared with a bulk density of 25 pounds per cubic foot for the minus 20 plus 30 mesh U.S. screen size fraction of drum dried product prepared according to the process of Benton et al.

EXAMPLE 6

This example illustrates the preparation according to the process of this invention of a coloring agent product having a vitamin A activity.

A solution of 50.8 grams retinal azine in 150 cc. toluene was emulsified in an aqueous solution comprised of 350 grams gum acacia, 140 grams sucrose and 570 grams water. The emulsion was heated on a steam bath under vacuum to remove the toluene and some water. To this emulsion was intimately admixed 305 grams of granular acacia essentially finer than 80 mesh U.S. screen size. A plastic dough resulted. The plastic dough was then extruded, dried, ground, and graded, thereby providing a dry form of a coloring agent product having vitamin A activity.

Thus, the process of this invention provides dry, finely divided, free flowing, solid products containing water insoluble, water dispersible composition and having high bulk density and high oxidative stability. Although not illustrated in the examples these products have good cold water dispersibility.

The process of this invention is also of advantage in that the products obtained thereby are unusually tough, withstand tableting pressures and do not permit extrusion of oil through compression during tableting operations. In this regard, the process of this invention enables hard and tough granules to be prepared in contrast to drum drying which provides porous, friable particles and to spray drying which provides soft particles.

Moreover, this invention provides a process which permits easy attainment of a desired particle size range of the end product (30 to 100 mesh U.S. screen size) through comminution. This particle size range is not easily or practically obtainable by spray drying techniques. The invention, in addition to providing a product having these advantages, provides a process whereby finely divided, recrystallized, retinal quinolate and the like can be incorporated into the end product without encountering excessive decomposition or splitting of the vitamin complex, which occurs at the high temperatures required in some drying procedures, such as atmospheric drum drying. Oxidative stability of retinal quinolate in one embodiment of the finely divided, solid product of this invention, whether the product is solvent leached or unleached, is equally high.

These and other advantages, features and embodiments of this invention will be readily apparent to those in the exercise of ordinary skill in the art upon reading the foregoing disclosure. In this regard, all embodiments of this invention including variations and modifications thereof embracing the spirit and essential characteristics of this invention are within the scope of the claimed subject matter unless expressly excluded by claim language.

I claim:

1. A process for preparing a dry, finely divided, solid product containing a water-insoluble, water dispersible composition, which comprises: forming in a solution consisting essentially of gum acacia and water a dispersion of said composition, the water concentration of said dispersion being in a range from about 30 to about 60 percent by weight of said dispersion; reducing the water concentration of said dispersion by admixing with said dispersion dry, finely divided gum acacia in sufficient quantity to form a plastic dough; forming said plastic dough into a thin shape; drying said thin shape with air at a temperature in a range from about 100 to about 212° F., whereby dry stock is formed; and comminuting said dry stock.

2. A process for preparing a dry, finely divided, solid product containing a water-insoluble, water dispersible pharmaceutical, which comprises: forming in a solution consisting essentially of gum acacia and water a dispersion of said pharmaceutical, the water concentration of said dispersion being in a range from about 30 to about 60 percent by weight of said dispersion; reducing the water concentration of said dispersion by admixing with said dispersion dry, finely divided gum acacia in sufficient quantity to form a plastic dough; forming said plastic dough into a thin shape; drying said thin shape with air at a temperature in a range from about 100 to about 212° F., whereby dry stock is formed; and comminuting said dry stock.

3. A process for preparing a dry, finely divided, fat-soluble vitamin-active, solid product, which comprises: forming in a solution consisting essentially of gum acacia and water a dispersion of a fat-soluble vitamin composition, the water concentration of said dispersion being in a range from about 30 to about 60 percent by weight of said dispersion; reducing the water concentration of said dispersion by admixing with said dispersion dry, finely divided gum acacia in sufficient quantity to form a plastic dough; forming said plastic dough into a thin shape; drying said thin shape with air at a temperature in a range from about 100 to about 212° F., whereby dry stock is formed; and comminuting said dry stock.

4. A process for preparing a dry, finely divided, fat-soluble vitamin-active, solid product, which comprises: forming in a solution consisting essentially of gum acacia and water a dispersion of a fat-soluble vitamin composition, said dispersion having a fat-soluble vitamin composition concentration in a range from about 5% to about 60% by weight, a gum acacia concentration in a range from about 10% to about 60% by weight and a water concentration in a range from about 30% to about 60% by weight; reducing the water concentration of said dispersion by admixing with said dispersion a quantity of dry, finely divided gum acacia in a range from about 0.7 to about 1.4 times the weight of the non-aqueous components of said dispersion, whereby a plastic dough is formed; forming said plastic dough into a thin shape; drying with air at a temperature in a range from about 100° F. to about 212° F. said thin shape, whereby dry stock is formed; and comminuting said dry stock.

5. A process for preparing a dry, finely divided, fat-soluble vitamin-active solid products, which comprises: forming in a solution consisting essentially of an edible plasticizer, gum acacia and water of a fat-soluble vitamin composition, said dispersion having a fat-soluble vitamin composition concentration in a range from about 5% to about 60% by weight, an edible plasticizer concentration up to about 25% by weight, a gum acacia concentration in a range from about 10% to about 60% by weight and a water concentration in a range from about 30% to about 60% by weight; reducing the water concentration of said dispersion by admixing with said dispersion a quantity of dry, finely divided gum acacia in a range from about 0.7 to about 1.4 times the weight of the non-aqueous components of said dispersion, whereby a plastic dough is formed; forming said plastic dough into a thin shape; drying with air at a temperature in a range from about 100° F. to about 212° F. said thin shape, whereby dry stock is formed; and comminuting said dry stock.

6. A process for preparing a dry, finely divided, fat-soluble vitamin-active, solid product, which comprises: forming in a solution consisting essentially of gum acacia and water a dispersion of a fat-soluble vitamin composition, the water concentration of said dispersion being in a range from about 30 to about 60 percent by weight of said dispersion; reducing the water concentration of said dispersion by admixing with said dispersion dry, finely divided gum acacia in sufficient quantity to form a plastic dough; forming said plastic dough into a thin shape; drying said thin shape with air at a temperature in a range from about 100 to about 212° F., whereby dry stock is formed; comminuting said dry stock; and leaching said dry stock with a solvent for said fat-soluble vitamin composition in which said gum acacia is insoluble.

7. A process for preparing a dry, finely divided, fat-soluble vitamin-active, solid product, which comprises: forming in a solution consisting essentially of an edible plasticizer, gum acacia and water a dispersion of a fat-soluble vitamin composition, said dispersion having a fat-soluble vitamin composition concentration in a range from about 5% to about 60% by weight, an edible plasticizer concentration up to about 25% by weight, a gum acacia concentration in a range from about 10% to about 60% by weight and a water concentration in a range from about 30% to about 60% by weight; reducing the water concentration of said dispersion by admixing with said dispersion a quantity of dry, finely divided gum acacia in a range from about 0.7 to about 1.4 times the weight of the non-aqueous components of said dispersion, whereby a plastic dough is formed; forming said plastic dough into a thin shape; drying with air at a temperature in a range from about 100° F. to about 212° F. said thin shape, whereby dry stock is formed; comminuting said dry stock; and leaching said dry stock with a solvent for said fat-soluble vitamin composition in which said gum acacia and plasticizer are insoluble.

8. A process according to claim 7 wherein said leaching is carried out by washing said dry stock with said solvent, separating said dry stock from said solvent and removing residual solvent from said dry stock by evaporation at a temperature less than about 212° F.

9. A process for preparing a dry, finely divided, vitamin A active, solid product, which comprises: forming in a solution consisting essentially of an edible plasticizer, gum acacia and water a dispersion of a vitamin A active composition, said dispersion having a vitamin A active composition concentration in a range from about 5% to about 60% by weight, an edible plasticizer concentration up to about 25% by weight, a gum acacia concentration in a range from about 10% to about 60% by weight and a water concentration in a range from about 30% to about 60% by weight; reducing the water concentration of said dispersion by admixing with said dispersion a quantity of dry, finely divided gum acacia in a range from about 0.7 to about 1.4 times the weight of the non-aqueous components of said dispersion, whereby a plastic dough is formed; forming said plastic dough into a thin shape; drying with air at a temperature in a range from about 100° F. to about 212° F. said thin shape, whereby dry stock is formed; and comminuting said dry stock.

10. A process for preparing a water dispersible, dry, finely divided, vitamin A active, solid product, which comprises: forming in a solution consisting essentially of an edible plasticizer, gum acacia and water a dispersion of retinal, said dispersion having a retinal concentration in a range from about 5% to about 60% by weight, an edible plasticizer concentration up to about 25% by weight, a gum acacia concentration in a range from about 10% to about 60% by weight and a water concentration in a range from about 30% to about 60% by weight; reducing the water concentration of said dispersion by admixing with said dispersion a quantity of dry, finely divided gum acacia in a range from about 0.7 to about 1.4 times the weight of the non-aqueous components of said dispersion, whereby a plastic dough is formed; forming said plastic dough into a thin shape; drying with air at a temperature in a range from about 100° F. to about 212° F. said thin shape, whereby dry stock is formed; and comminuting said dry stock.

11. A process for preparing a dry, finely divided, vitamin A active, solid product, which comprises: forming in a solution consisting essentially of an edible plasticizer, gum acacia and water a dispersion of finely divided crystalline complex of retinal and a phenolic complexing agent, said dispersion having a crystalline complex concentration in a range from about 5% to about 60% by weight, an edible plasticizer concentration up to about 25% by weight, a gum acacia concentration in a range from about 10% to about 60% by weight and a water concentration in a range from about 30% to about 60% by weight; reducing the water concentration of said dispersion by admixing with said dispersion a quantity of dry, finely divided gum acacia in a range from about 0.7 to about 1.4 times the weight of the non-aqueous components of said dispersion, whereby a plastic dough is formed; forming said plastic dough into a thin shape; drying with air at a temperature in a range from about 100° F. to about 212° F. said thin shape, whereby dry stock is formed; and comminuting said dry stock.

12. A process for preparing a water dispersible, dry, finely divided, vitamin A active, solid product, which comprises: forming in a solution consisting essentially of an edible plasticizer, gum acacia and water a dispersion of finely divided retinal quinolate, said dispersion having a retinal quinolate concentration in a range from about 5% to about 60% by weight, an edible plasticizer concentration up to about 25% by weight, a gum acacia concentration in a range from about 10% to about 60% by weight and a water concentration in a range from about 30% to about 60% by weight; reducing the water concentration of said dispersion by admixing with said dispersion a quantity of dry, finely divided gum acacia in a range from about 0.7 to about 1.4 times the weight of the non-aqueous components of said dispersion, whereby a plastic dough is formed; forming said plastic dough into a thin shape; drying with air at a temperature in a range from about 100° F. to about 212° F. said thin shape, whereby dry stock is formed; and communiuting said dry stock.

13. A process for preparing a water dispersible, dry, finely divided, vitamin A active, solid product, which comprises: forming in a solution consisting essentially of an edible plasticizer, gum acacia and water a dispersion of finely divided retinal azine, said dispersion having a retinal azine concentration in a range from about 5% to about 60% by weight, an edible plasticizer concentration up to about 25% by weight, a gum acacia concentration in a range from about 10% to about 60% by weight and a water concentration in a range from about 30% to about 60% by weight; reducing the water concentration of said dispersion by admixing with said dispersion a quantity of dry, finely divided gum acacia in a range from about 0.7 to about 1.4 times the weight of the non-aqueous components of said dispersion, whereby a plastic dough is formed; forming said plastic dough into a thin shape; drying with air at a temperature in a range from about 100° F. to about 212° F. said thin shape, whereby dry stock is formed; and comminuating said dry stock.

14. A process for preparing a dry, finely divided, vitamin E active, solid product, which comprises: forming in a solution consisting essentially of an edible plasticizer, gum acacia and water to a dispersion of a vitamin E active composition, said dispersion having a vitamin E active composition concentration in a range from about 5% to about 60% by weight, an edible plasticizer concentration up to about 25% by weight, a gum acacia concentration in a range from about 10% to about 60% by weight and a water concentration in a range from about 30% to about 60% by weight; reducing the water concentration of said dispersion by admixing with said dispersion a quantity of dry, finely divided gum acacia in a range from about 0.7 to about 1.4 times the weight of the non-aqueous components of said dispersion, whereby a plastic dough is formed; forming said plastic dough into a thin shape; drying with air at a temperature in a range from about 100° F. to about 212° F. said thin shape; whereby dry stock is formed; and comminuting said dry stock.

15. A process for preparing a water-dispersible, dry, finely divided, vitamin E active, solid product, which comprises: forming in a solution consisting essentially of an edible plasticizer, gum acacia and water a dispersion of α-tocopheryl acetate, said dispersion having an α-tocopheryl acetate concentration in a range from about 5% to about 60% by weight, an edible plasticizer concentration up to about 25% by weight, a gum acacia concentration in a range from about 10% to about 60% by weight and a water concentration in a range from about 30% to about 60% by weight; reducing the water concentration of said dispersion by admixing with said dispersion a quantity of dry, finely divided gum acacia in a range from about 0.7 to about 1.4 times the weight of the non-aqueous components of said dispersion, whereby a plastic dough is formed; forming said plastic dough into a thin shape; drying with air at a temperature in a range from about 100° F. to about 212° F. said thin shape, whereby dry stock is formed; and comminuting said dry stock.

References Cited in the file of this patent

UNITED STATES PATENTS 2,940,900     Benton _____ June 14, 1960